(12) United States Patent
Ansems et al.

(10) Patent No.: US 12,111,048 B2
(45) Date of Patent: Oct. 8, 2024

(54) LIGHT EMITTING DEVICE

(71) Applicant: SIGNIFY HOLDING B.V., Eindhoven (NL)

(72) Inventors: Johannes Petrus Maria Ansems, Hulsel (NL); Michel Cornelis Josephus Marie Vissenberg, Roermond (NL); Olexander Valentynovych Vdovin, Maarheeze (NL); Peter Johannes Martinus Bukkems, Deume (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 18/271,199

(22) PCT Filed: Jan. 6, 2022

(86) PCT No.: PCT/EP2022/050187
§ 371 (c)(1),
(2) Date: Jul. 6, 2023

(87) PCT Pub. No.: WO2022/148803
PCT Pub. Date: Jul. 14, 2022

(65) Prior Publication Data
US 2024/0084995 A1    Mar. 14, 2024

(30) Foreign Application Priority Data

Jan. 11, 2021   (EP) ..................................... 21150842

(51) Int. Cl.
*F21V 5/00*    (2018.01)
*F21S 8/08*    (2006.01)
(Continued)

(52) U.S. Cl.
CPC ............... *F21V 5/007* (2013.01); *F21S 8/086* (2013.01); *F21V 5/04* (2013.01); *F21V 7/0091* (2013.01);
(Continued)

(58) Field of Classification Search
CPC .......... F21V 5/007; F21V 5/04; F21V 7/0091; F21S 8/086
See application file for complete search history.

(56) References Cited

U.S. PATENT DOCUMENTS 8,628,222 B2 *  1/2014  Kelley ............... G02B 19/0028
                                                         362/311.06
9,200,765 B1 * 12/2015  Broughton ............ F21V 7/0091
(Continued)

FOREIGN PATENT DOCUMENTS

DE    102016103288 A1    8/2017
EP         2023689 A2    2/2009
(Continued)

*Primary Examiner* — Arman B Fallahkhair

(57) ABSTRACT

A light emitting device (1) comprising at least one light source (2) adapted for, in operation, emitting light (7, 9), at least one free-shape refractive lens element (3) configured to aim light (7) emitted by the at least one light source (2) in a first direction towards a surface (22) to be illuminated by the light emitting device (1), the lens element (3) comprising a first end (11) adapted for facing in a direction towards the surface (22) and a second end (20) adapted for facing in a direction away from the surface (22), at least one first TIR element (4), the first TIR element (4) being a collimating TIR element configured to collimate and redirect light (9) emitted from the at least one light source (2) in a second direction away from the surface (22) into light (9') propagating parallel and in a downward direction, the first TIR element (4) comprising a light incoupling surface (19) and a light outcoupling surface (13), the light incoupling surface (19) being arranged at the second end (20) of the lens (Continued)

element (3), and at least one second TIR element (5) configured to redirect light (9') redirected by the first TIR element (4) into light (9") propagating in a direction towards the surface (22) and comprising an intensity distribution with two intensity peaks at wide angles that are aligned with the intensity peaks of light (7') aimed by the lens element (3), the at least one second TIR element (5) being arranged at the light outcoupling surface (13) of the first TIR element (4).

14 Claims, 9 Drawing Sheets

(51) Int. Cl.
- *F21V 5/04* (2006.01)
- *F21V 7/00* (2006.01)
- *F21W 131/103* (2006.01)
- *F21Y 105/16* (2016.01)
- *F21Y 115/10* (2016.01)

(52) U.S. Cl.
CPC .... *F21W 2131/103* (2013.01); *F21Y 2105/16* (2016.08); *F21Y 2115/10* (2016.08)

(56) References Cited

U.S. PATENT DOCUMENTS

| | | | |
|---|---|---|---|
| 9,500,324 B2 * | 11/2016 | Dong | F21K 9/62 |
| 9,689,554 B1 * | 6/2017 | Householder | G02B 19/0061 |
| 9,816,682 B2 * | 11/2017 | Chen | F21V 5/04 |
| 9,835,309 B2 * | 12/2017 | Cho | G02B 19/0028 |
| 10,054,285 B2 * | 8/2018 | Demuynck | F21V 31/005 |
| 11,686,438 B1 * | 6/2023 | Hong | F21V 7/0066 |
| | | | 362/257 |
| 2010/0073927 A1 | 3/2010 | Lewin et al. | |
| 2012/0307495 A1 * | 12/2012 | Shih | G02B 19/0066 |
| | | | 362/237 |
| 2014/0016326 A1 | 1/2014 | Dieker et al. | |
| 2014/0063802 A1 | 3/2014 | Garcia | |
| 2016/0047528 A1 * | 2/2016 | Goldstein | F21V 5/08 |
| | | | 362/329 |
| 2016/0161084 A1 | 6/2016 | Cho | |
| 2017/0074483 A1 * | 3/2017 | Yu | G02B 19/0061 |
| 2018/0087751 A1 | 3/2018 | Jung et al. | |
| 2018/0294389 A1 | 10/2018 | Tarsa et al. | |
| 2019/0101262 A1 | 4/2019 | Jou | |

FOREIGN PATENT DOCUMENTS

| | | |
|---|---|---|
| EP | 3211297 A1 | 8/2017 |
| WO | 2019135021 A1 | 7/2019 |

* cited by examiner

LIGHT EMITTING DEVICE

CROSS-REFERENCE TO PRIOR APPLICATIONS

This application is the U.S. National Phase application under 35 U.S.C. § 371 of International Application No. PCT/EP2022/050187, filed on Jan. 6, 2022, which claims the benefit of European Patent Application No. 21150842.9, filed on Jan. 11, 2021. These applications are hereby incorporated by reference herein.

FIELD OF THE INVENTION

The invention relates to a light emitting device comprising at least one light source adapted for, in operation, emitting light, and at least one free-shape refractive lens element configured to aim light emitted by the at least one light source in a first direction towards a surface to be illuminated by the light emitting device, the free-shape refractive lens element comprising a first end adapted for facing in a direction towards the surface to be illuminated and a second end adapted for facing in a direction away from the surface to be illuminated.

As used herein, the term "downward" is generally meant to encompass any direction within an angle of 30 degrees, and particularly within an angle of 10 or 5 degrees, to either side of the vertical. The term "the vertical" is intended to refer to the direction aligned with the direction of the force of gravity, up or down, as materialized e.g. with a plumb line.

BACKGROUND OF THE INVENTION

In street and road lighting it is desired that most of the light should be aimed at the street or road for an effective use of the light. All light in other directions is typically considered as a waste or even light pollution, as it may lead to unwanted effects like glare, light trespassing and sky glow.

For LED luminaires, the typical road lighting architecture consists of an LED array arranged on a PCB and an optical plate that contains a free-shape lens per LED to direct the light in the preferred directions. One example of such a LED luminaire is the Clearway road lighting luminaire which is equipped with a DM10 lens, which is a so-called free-shape peanut lens. This free-shape peanut lens aims light in two peak intensity directions along the road, and further creates a light distribution with a smooth intensity gradient in the remaining angular space, for a variety of standardized distributions. The DM10 peanut lens provides a maximum intensity of Imax=629 cd/klm. The optical efficiency in terms of the Light Output Ratio (LOR) is 87.2%. Spill light in the forward direction (the direction towards the road) is well controlled with a sharp intensity cut-off, but a large amount of light (about 32%) is spilled in the backward direction (towards the pavement or roadside).

In this particular design, the free-shape lens contains a small protruding part at the backside. This small structure reflects the light in the backward direction back to the PCB surface. A white PCB surface then provides diffuse lighting around the pole, whereas a black PCB surface may, at the cost of a lower efficiency, be used to absorb the backward directed light, in case stringent light pollution constraints are posed for the backward light.

Refractive free-shape lens optics is very suitable for controlling light in the direction towards the road, but not for controlling light in the direction behind the pole. Currently known solutions either diffuse or absorb the backward light, depending on the constraints of light pollution. Free-shape lenses with TIR facets are also known for redirecting light towards the road. While these improve the general direction and therefore the effective use of light, this redirected light cannot be controlled to the high degree needed to produce the desired peaked intensity distribution.

U.S. Pat. No. 9,200,765 B1 discloses a street illumination system comprising a light source and an optic or lens with a protrusion, the protrusion comprising two reflecting, and typically totally internal reflecting (TIR), structures. The light source emits light in two main directions, namely towards a house side, that is in a direction away from the street to be illuminated, and towards a street side, that is in a direction directly towards the street to be illuminated. The two reflective structures are simple surfaces and are configured to redirect light emitted from the light source towards the house side. When the light emitted towards the house side is reflected by the two reflective surfaces, the result is a single redirected beam directed towards the street side, but in a direction different from the main direction of the light emitted from the light source in a direction towards the street side. Also, with this solution there still is an amount of the light emitted towards the house side which is not redirected by the reflective surfaces, and which is thus lost.

There is thus a desire to provide a LED luminaire for use in street and road lighting with which light losses are lowered and the efficiency increased, and which also enables controlling redirected light to the high degree needed to produce the desired peaked intensity distribution.

SUMMARY OF THE INVENTION

It is an object of the present invention to overcome this problem, and to provide a light emitting device for street lighting purposes with which light losses are lowered and the efficiency increased, and which also enables controlling redirected light to the high degree needed to produce the desired peaked intensity distribution.

According to a first aspect of the invention, this and other objects are achieved by means of a light emitting device comprising at least one light source adapted for, in operation, emitting light, at least one free-shape refractive lens element configured to aim light emitted by the at least one light source in a first direction towards a surface to be illuminated by the light emitting device, the free-shape refractive lens element comprising a first end adapted for facing in a direction towards the surface to be illuminated and a second end adapted for facing in a direction away from the surface to be illuminated, at least one first total internal reflection (TIR) element, the first TIR element being a collimating TIR element configured to collimate and redirect light emitted from the at least one light source in a second direction away from the surface to be illuminated into light propagating parallel and in a downward direction, the first TIR element comprising a light incoupling surface and a light outcoupling surface, the light incoupling surface of the first TIR element being arranged at the second end of the free-shape refractive lens element, and at least one second TIR element configured to redirect light collimated and redirected by the first TIR element into light propagating in a direction towards the surface to be illuminated and comprising an intensity distribution with two intensity peaks at wide angles that are aligned with the intensity peaks of light aimed by the free-shape refractive lens element, the at least one second TIR element being arranged at the light outcoupling surface of the first TIR element, the light outcoupling surface indicating the position where the first TIR element is ending and the second TIR element is beginning.

Thereby, and especially by providing both a first TIR element and a second TIR element arranged and configured as described above, a light emitting device is provided with which light losses are lowered and the efficiency increased, and which also enables controlling redirected light to the high degree needed to produce the desired peak intensity distribution.

Also, such a light emitting device enables considerably reducing or even avoiding light waste and light pollution by reducing or altogether eliminating adverse effects such as glare, light trespassing and sky glow stemming from light inadvertently being emitted towards other surfaces and areas than the surface it is desired to illuminate.

Furthermore, in some cases the free-shape lens may also be adapted to redistribute the light to other directions, if necessary.

Such a light emitting device is therefore especially suitable for street lighting purposes and other lighting purposes in which a large degree of directional control of the light is needed to avoid adverse effects as those mentioned above.

In an embodiment, the at least one second TIR element is an asymmetric element or a tilted prism-shaped element.

Providing the second TIR element with such an optical architecture provides for a light emitting device with which the light redirecting properties are particularly good. Thereby, particularly low light losses and a particularly high efficiency is obtained. In principle, the two intensity peaks formed by the free-shape lens element are symmetrically distributed along a longitudinal direction of the surface to be illuminated, but asymmetrically in a direction across the surface to be illuminated. Alternatively, the two intensity peaks formed by the free-shape lens element may also be symmetrically distributed in the direction across the surface to be illuminated. In any event, the asymmetry in the direction across the surface to be illuminated may be created by tilting the parallel beam resulting from the first TIR element with respect to the vertical direction, in which case the prisms may be symmetric, or by bending a vertical parallel beam through a tilted prism.

Thus, in a particular embodiment, the second TIR element is an element being mirror symmetric in a vertical plane perpendicular to the surface to be illuminated, and asymmetric in an orthogonal direction across the surface to be illuminated.

In an embodiment, the at least one second TIR element comprises a plurality of light outcoupling elements, the light outcoupling elements comprising a shape being prism-shaped, cone-shaped or a combination of prism-shaped and cone-shaped.

Providing the second TIR element with light outcoupling elements or facets with such an optical architecture provides for a light emitting device with which the light redirecting properties are optimized. Thereby, particularly low light losses and a particularly high efficiency is obtained.

In an embodiment, the at least one second TIR element comprises a plurality of light outcoupling elements, the light outcoupling elements comprising a cross-sectional shape being any one of triangular, asymmetric triangular and isosceles triangular. Alternatively, or additionally, the light outcoupling elements comprise a curvature or a spline shape.

Providing the second TIR element with light outcoupling elements or facets with such an optical architecture provides for a light emitting device with a second TIR element of a simple structure with which the light redirecting properties are particularly good. Thereby, particularly low light losses and a particularly high efficiency is obtained.

In an embodiment, the at least one second TIR element is provided with a surface texture or a surface coating or an anti-reflection coating.

Providing the second TIR element with a coating enables further lowering the light losses and further increasing the efficiency of the light emitting device.

In an embodiment, the at least one free-shape refractive lens element is a peanut-shaped lens element configured for providing an intensity distribution comprising two intensity peaks.

Such a free-shape lens element is designed for illuminating rectangular areas such as roads, and more particularly to evenly illuminate the far sides of the rectangular area. To obtain this, the free-shape lens element needs to produce two intensity peaks, which often results in the free-shape lens element having two bulging sides. Sometimes such a free-shape lens element is therefore referred to as a peanut lens. A peanut-shaped lens element is therefore one example of a suitable free-shape lens element. Thereby, a light emitting device is provided with which the aiming of the light emitted by the at least one light source in a first direction towards a surface to be illuminated is especially precise and efficient.

In an embodiment, the at least one free-shape refractive lens element, the at least one first TIR element and the at least one second TIR element are provided in one piece.

Thereby a light emitting device is provided which has a particularly simple and robust structure, and which is simple and relatively cheap to manufacture.

In an embodiment, the at least one free-shape refractive lens element, the at least one first TIR element and the at least one second TIR element are injection molded or cast or molded or 3D printed or compression molded or embossed.

Thereby a light emitting device is provided which is simple and relatively cheap to manufacture in large numbers.

In an embodiment, the light emitting device comprises an array of light sources and associated with each light source of the array of light sources a free-shape refractive lens element, a first TIR element and a second TIR element.

Thereby a light emitting device is provided with which an increased intensity of the total light output of the light emitting device may be obtained in a particularly simple manner while still obtaining the above described advantages.

In an embodiment, the light emitting device further comprises a lens plate comprising an array of units, each unit comprising a free-shape refractive lens element, a first TIR element and a second TIR element.

Thereby a light emitting device is provided with which an increased intensity of the total light output of the light emitting device may be obtained in a particularly simple manner while still obtaining the above described advantages, and which in addition has a particularly simple and robust structure, and which is simple and relatively cheap to manufacture.

In an embodiment, the lens plate is provided in one piece. Thereby a light emitting device is provided has a particularly simple and robust structure, which is simple and relatively cheap to manufacture, and which is also particularly simple to assemble.

The invention further concerns a luminaire comprising a light emitting device according to any one of the above claims. The luminaire may comprise a pole, a stand or a suspension arrangement. The luminaire may be an industry luminaire, a tunnel luminaire, a road lighting luminaire, a wall washing luminaire or a street lighting luminaire.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
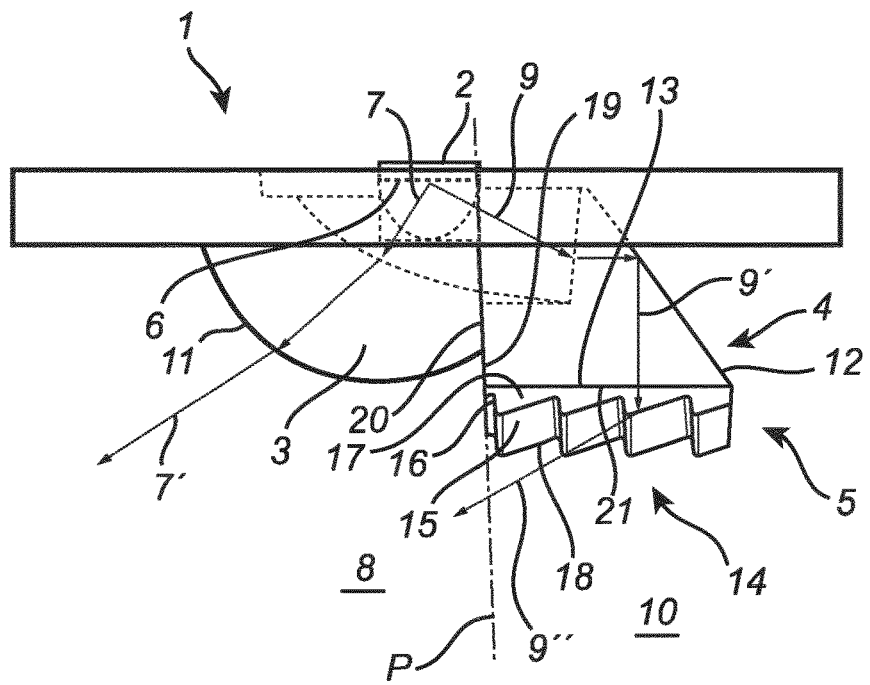
FIG. 1 shows a perspective side view of a light emitting device according to a first embodiment of the invention and comprising a light source, a free-shape refractive lens element, a first TIR element, and a second TIR element.
Figure 1:
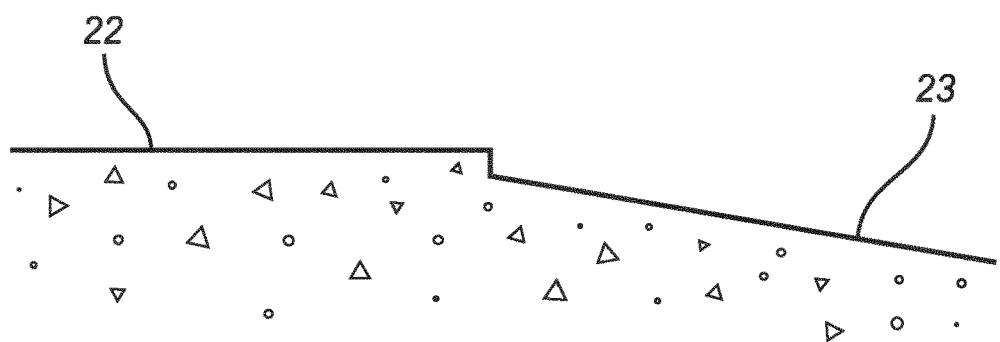
Figure 2:
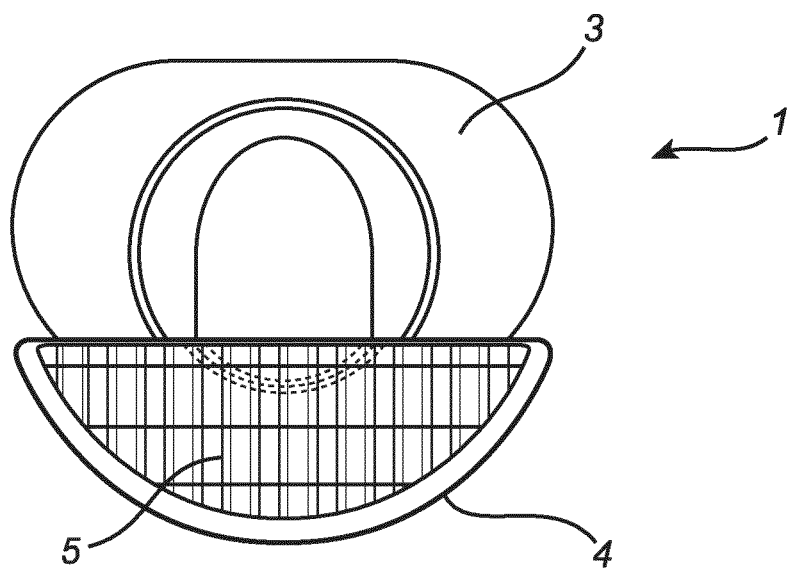
FIG. 2 shows a top view of the light emitting device according to FIG. 1.
Figure 3:
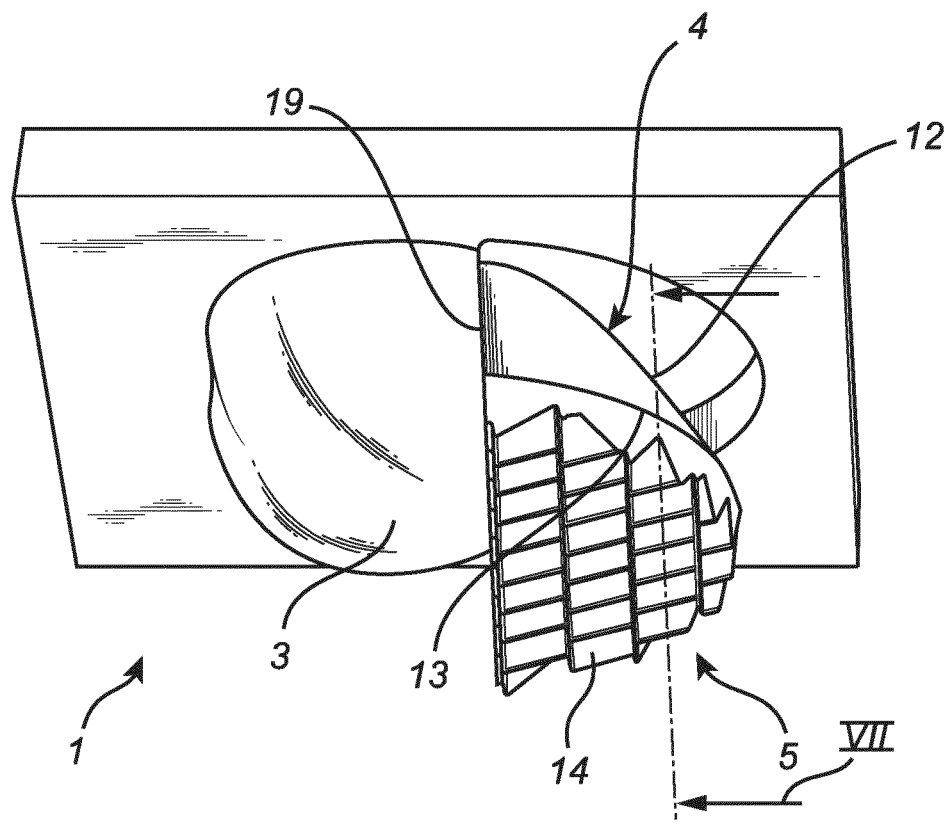
FIG. 3 shows a perspective view of the light emitting device according to FIG. 1.

Referring first to FIGS. 1-3, FIG. 1 shows a perspective side view of a light emitting device 1 according to a first embodiment of the invention. FIG. 2 shows a top view of the light emitting device 1 and FIG. 3 shows a perspective view of the light emitting device 1.

Generally, and irrespective of the embodiment, the light emitting device 1 according to the invention comprises at least one light source 2, a free-shape refractive lens element 3, a first TIR element 4 and a second TIR element 5.

The at least one light source 2 is adapted for, in operation, emitting light 7, 9. As illustrated on FIG. 1, a first part 7 of the light emitted by the at least one light source 2 is emitted in a first direction generally towards a surface 22 to be illuminated, such as a road surface, and a second part 9 of the light is emitted in a second direction generally away from the surface 22 to be illuminated and towards a surface or area 23 next to the surface 22 to be illuminated. The surface or area 23 may for instance be a ditch, trench or another surface next to a road surface. The at least one light source 2 comprises a light exit surface 6 from which the light 7, 9 is emitted. The at least one light source 2 may in principle be any feasible type of light source but is typically an LED light source.

The surface 22 may in principle be any surface which it is desired to illuminate, but is in particular a road, a street, a cycling path, a pedestrian path, a parking lot or any other traffic surface. The surface or area 23 may be a ditch, a piece of land, a plot or a like area, or any other area, next to the surface 22 which area 23 it is not desired to illuminate.

The free-shape refractive lens element 3 is generally and irrespective of the embodiment configured to aim and focus the first light 7 emitted by the at least one light source 2 in the first direction into light 7' propagating towards a surface 22 to be illuminated by the light emitting device 1.

The free-shape refractive lens element 3 comprises a first end or surface 11 adapted for facing in the first direction and for aiming and focusing the first light 7 into the light 7'. The free-shape refractive lens element 3 further comprises a second end or surface 20 facing in the second direction. The second light 9 leaves the free-shape refractive lens element 3 through the second surface 20. The free-shape refractive lens element 3 may be a lens element configured for providing an intensity distribution comprising two intensity peaks or a peanut-shaped lens element.

The first TIR element 4 is a collimating TIR element 4 configured to redirect and collimate the second light 9 emitted from the at least one light source 2 in the second direction into light 9' propagating in a parallel, downward direction. The first TIR element 4 comprises a light incoupling surface 19, a TIR surface 12 and a light outcoupling surface 13. The light outcoupling surface 13 is to be understood as a virtual surface indicating the position where the first TIR element 4 is ending and the second TIR element 5 is beginning, rather than a physical surface. The light incoupling surface 19 of the first TIR element 4 is arranged at the second end 20 of the free-shape refractive lens element 3. The first TIR element 4 thus receives the second light 9 at the light incoupling surface 19. The TIR surface 12 redirects and collimates the second light 9 into the light 9'. The collimated and redirected light 9' is leaving the first TIR element 4 at the light outcoupling surface 13.

The light emitting device 1 comprises one or more second TIR elements 5. In any event, the at least one second TIR element 5 is configured to redirect the light 9' being collimated and redirected by the first TIR element 4 into light 9" propagating in a direction generally towards the surface 22 to be illuminated and comprising an intensity distribution with two intensity peaks at wide angles that are aligned with the intensity peaks of the light 7' aimed and focused by the free-shape refractive lens element 3. The at least one second TIR element 5 comprises a light incoupling surface 21 and one or more light outcoupling elements 14. The light outcoupling elements 14 may be facetted light outcoupling elements 14. The at least one second TIR element 5 is arranged at the light outcoupling surface 13 of the first TIR element 4. The at least one second TIR element 5 receives the collimated and redirected light 9' at the light incoupling surface 21. Thus, the light incoupling surface 21 is to be understood as a virtual surface indicating the position where the second TIR element 5 is beginning and receiving the light from the first TIR element 4, rather than a physical surface. The redirected light 9" leaves the second TIR element at, and more particularly through a surface of, the light outcoupling elements 14. It is noted that the at least one second TIR element 5 may cover the entire light outcoupling surface 13 of the first TIR element 4.

Generally, the at least one second TIR element 5 may be an asymmetric element or a tilted prism-shaped element. Generally, and as shown particularly in FIGS. 1, the one or more light outcoupling elements 14 of the second TIR element 5 comprises a first surface or TIR surface 15 where TIR occurs and which redirects the incoming light 9' into the light 9". The one or more light outcoupling elements 14 of the second TIR element 5 further comprises a second surface 16, a third surface 17 and a fourth surface 18. The one or more light outcoupling elements 14 have in the embodiment shown in FIGS. 1-3 a cross-sectional shape being that of an asymmetric triangle where an imaginary line extending along the first surface 15 and perpendicular to both respective lines defining the transition between the first surface 15 and the respective adjacent second surfaces 16 forms a first and longest catheter of the asymmetric triangle, and an imaginary line extending along the second surface 16 and perpendicular to both respective lines defining the transition between the second surface 16 and the respective adjacent first surfaces 15 forms a second and shorter catheter of the asymmetric triangle. Thus, in the embodiment shown in FIGS. 1-3, the at least one second TIR element 5 is an asymmetric element, and in particular a tilted prism-shaped element.

In FIG. 1 an imaginary plane P is shown. The plane P extends perpendicular to the light exit surface 6 of the light source 2 and parallel with the light incoupling surface 19 of the first TIR element 4. Using this imaginary plane P as a reference, the term "direction towards the surface to be illuminated" as used herein may be defined as any direction defined as extending away from any point of the light exit surface 6 of the light source 2 and towards the area or volume on a first side 8 of the imaginary plane P nearest to the surface 22 to be illuminated as seen on FIG. 1. The term "direction towards the surface to be illuminated" as used herein may also be defined as any direction defined as extending away from any point of the light exit surface 6 of the light source 2 and towards the surface 11 of the free-shape refractive lens.

Likewise, the term "direction away from the surface to be illuminated" as used herein may be defined as any direction defined as extending away from any point of the light exit surface 6 of the light source 2 and towards the area or volume on a second side 10 of the imaginary plane P farther from the surface 22 to be illuminated and opposite to the first side 8 as seen on FIG. 1. The term "direction away from the surface to be illuminated" as used herein may also be defined as any direction defined as extending away from any point of the light exit surface 6 of the light source 2 and towards the first TIR element 4.

Finally, the term "parallel, downward direction" as used herein may be defined as a direction parallel with the imaginary plane P, or in an angle of a few degrees, e.g. 1 to 5 degrees, with the imaginary plane P. The term "parallel, downward direction" may also be defined as a direction perpendicular to the surface 22 to be illuminated, or extending in a direction within a few degrees, e.g. 1 to 5 degrees, of perpendicular to the surface 22 to be illuminated. In embodiments where the light emitting device further comprises a pole 26 (cf. FIG. 12), the term "parallel, downward direction" may also be defined as parallel, or in an angle of a few degrees, e.g. 1 to 5 degrees with parallel, to a longitudinal extension of the pole 26. Finally, the term "parallel, downward direction" may also be defined as parallel, or in an angle of a few degrees, e.g. 1 to 5 degrees with parallel, to the vertical, where "the vertical" is intended to refer to the direction aligned with the direction of the force of gravity, up or down, as materialized e.g. with a plumb line.

The free-shape refractive lens element 3, the first TIR element 4 and the second TIR element 5 may be manufactured by injection molding. Alternative manufacturing methods include compression molding, embossing, casting, extrusion or 3D-printing. The free-shape refractive lens element 3, the first TIR element 4 and the second TIR element 5 is generally provided in one piece. Alternatively, the free-shape refractive lens element 3, the first TIR element 4 and the second TIR element 5 may be provided as separate elements connected to one another, e.g. by means of a suitable optical glue.

Figure 4:
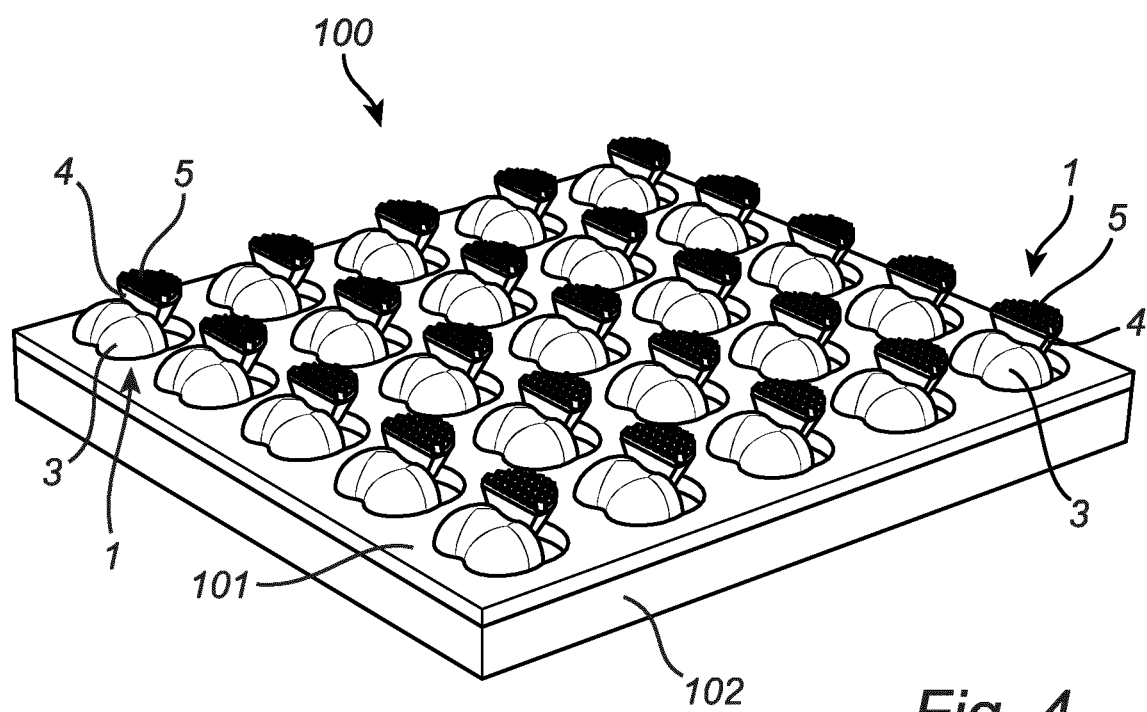
FIG. 4 shows a perspective view of a light emitting device according to a second embodiment of the invention and comprising an array of light emitting devices according to FIG. 1.

Turning now to FIG. 4, a perspective view of a light emitting device 100 according to a second embodiment of the invention is shown. The light emitting device 100 comprises a light source plate 102 with an array of light sources 2 (not visible on FIG. 4) and a lens plate 101. The light source plate 102 and the lens plate 101 together form an array of five by five light emitting devices 1 of the type described above in relation to FIGS. 1-3. The lens plate 101 thus comprises five by five units each comprising a free-shape refractive lens element 3, a first TIR element 4 and a second TIR element 5. Lens plates with arrays comprising another number of such units are also feasible. Light source plates 102 and lens plates forming other types of light emitting devices according to the invention or several mutually different light emitting devices according to the invention are also feasible.

The light source plate 102 and the lens plate 101 are arranged over or connected to each other in such a way that each light source of the light source plate 102 is associated with a unit comprising a free-shape refractive lens element 3, a first TIR element 4 and a second TIR element 5 of the lens plate 101. As illustrated in FIG. 4, the lens plate may be provided in one piece, e.g. by extrusion, molding, casting or 3D-printing.

Figures 5, 6:
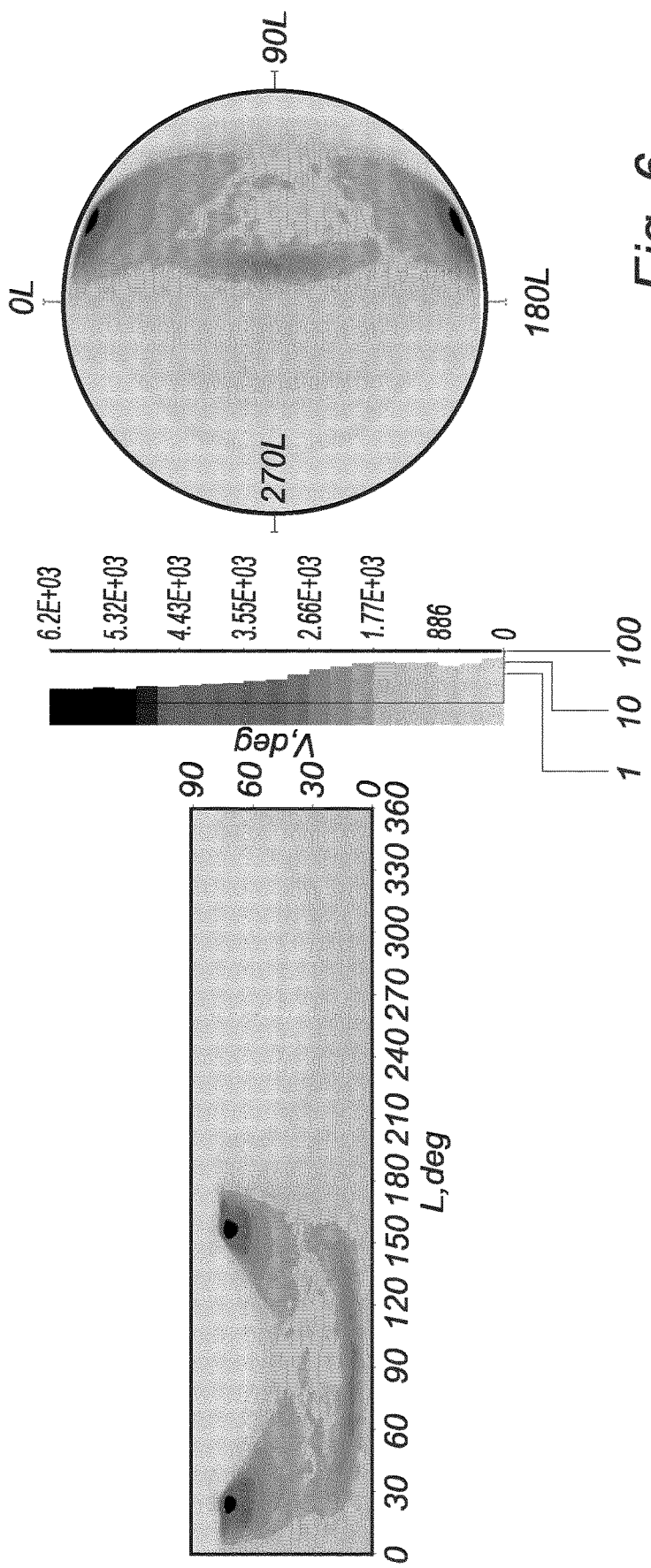
FIGS. 5 and 6 shows a cartesian and a polar plot, respectively, illustrating the intensity distribution resulting from the light emitting device according to FIG. 4.

FIGS. 5 and 6 shows two different plots illustrating the intensity distribution resulting from the light emitting device according to FIG. 4. More particularly, FIG. 5 shows a cartesian plot and FIG. 6 shows a polar plot of the intensity distribution resulting from the light emitting device according to FIG. 4.

Compared to a reference light emitting device comprising a prior art lens plate of the DM10-type, the plots reveal that the peak intensity is 1000 cd/klm or is increased by 159%, the Light Output Ratio (LOR) is 86.14% or is decreased only by 1%, and the unwanted spill light on the surface or area 23 next to the surface 22 to be illuminated is reduced from 32% of the total flux to 23% of the total flux. As such, it is clear that the optical architecture according to the invention and as shown in FIGS. 1-3 improves the peak intensity, which is an important performance parameter in road lighting, and reduces spill light, essentially without an efficiency penalty.

Figure 7:
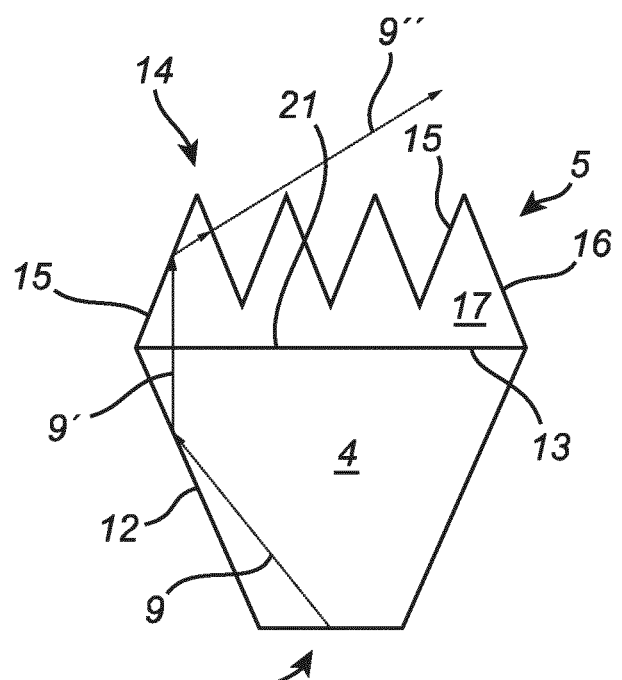
FIG. 7 shows a cross sectional side view of the first TIR element and the second TIR element of the light emitting device according to FIGS. 1-3 seen along the line VII in FIG. 3.

FIG. 7 shows a cross sectional side view of the first TIR element and the second TIR element of the light emitting device 1 according to FIGS. 1-3 seen along the line VII in FIG. 3.

As shown in FIG. 7, one or more of the light outcoupling elements 14 of the at least one second TIR element 5 may optionally be provided with a surface texture or a surface coating 25. The surface texture or surface coating 25 may for instance be a small surface roughness covering a part or all of the surface and made by engraving or etching or spark erosion of the mold. Alternatively, the surface texture or surface coating 25 may for instance also be an antireflection coating.

Figure 8:
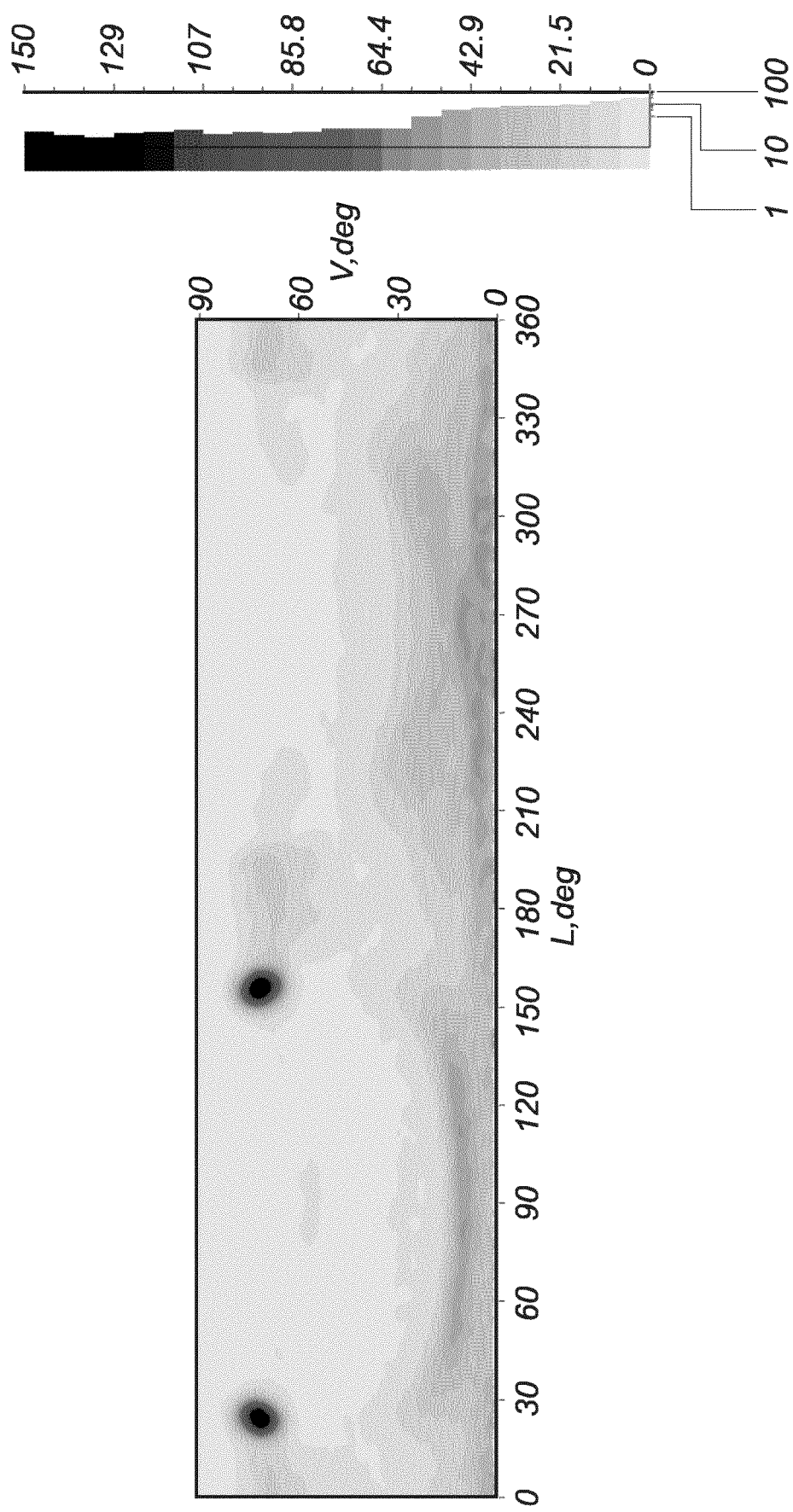
FIG. 8 shows a cartesian plot illustrating the intensity distribution resulting from a light emitting device according to FIGS. 1-3 and 7, albeit illustrating only the part of the intensity distribution resulting from the first TIR element and the second TIR element, but not the part of the intensity distribution resulting from the free-shape refractive lens element.

FIG. 8 shows a cartesian plot illustrating the intensity distribution resulting from a light emitting device according to FIGS. 1-3 and 7. The intensity distribution shown in FIG. 8 illustrates only the part of the intensity distribution resulting from the first TIR element and the second TIR element, but not the part of the intensity distribution resulting from the free-shape refractive lens element. While in the intensity distribution shown in FIG. 8 a smaller part of the light is also directed to other directions than the peaks (mostly in the directions below the light emitting device), the refractive part of the free-shape refractive lens 3 can be re-designed in order to produce a final smooth light distribution. It is clear from the plot of FIG. 8, that also with a light emitting device 1 according to FIGS. 1-3 and 7 the peak intensity, which is an important performance parameter in road lighting, is improved and the light spill is reduced, essentially without an efficiency penalty.

Figure 9:
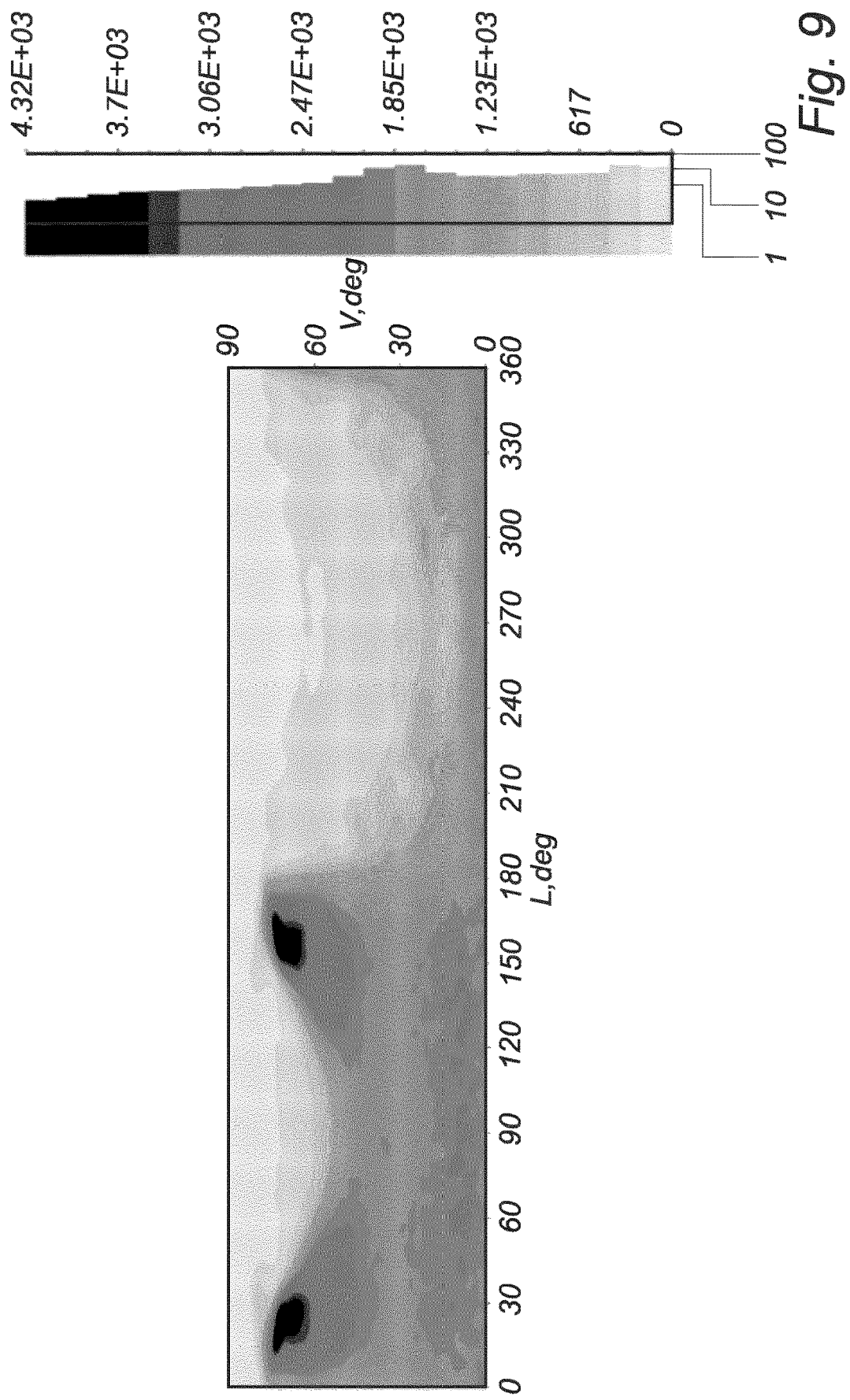
FIG. 9 shows a cartesian plot illustrating the total intensity distribution resulting from light emitting device according to FIGS. 1-3 and 7, and thus illustrating both the part of the intensity distribution resulting from the first TIR element and the second TIR element and the part of the intensity distribution resulting from the free-shape refractive lens element.

Turning now to FIG. 9 a cartesian plot illustrating the intensity distribution resulting from yet another light emitting device according to the invention is shown, where the light emitting device in this case is provided with at least one second TIR element 5 having light outcoupling elements 14 being a shaped as a combination of a cone and a tilted prism. FIG. 9 illustrates the total intensity distribution resulting from light emitting device according to FIGS. 1-3 and 7, and thus illustrating both the part of the intensity distribution resulting from the first TIR element and the second TIR element and the part of the intensity distribution resulting from the free-shape refractive lens element. The light outcoupling elements 14 may be facetted light outcoupling elements 14. Such a second TIR element 5 is thus essentially provided with light outcoupling elements 14 having a shape being a combination of a cone and a tilted prism. Compared to a reference light emitting device comprising a prior art lens plate of the DM10-type, the plot of FIG. 10 reveals that the peak intensity is 4320 cd in the peak direction (C23 gamma 72) and the Light Output Ratio (LOR) is 86.2%. As such, it is clear that also with a light emitting device comprising an optical architecture being a combination of a cone and a tilted prism, the peak intensity, which is an important performance parameter in road lighting, is improved and the light spill is reduced, essentially without an efficiency penalty.

Figure 10:
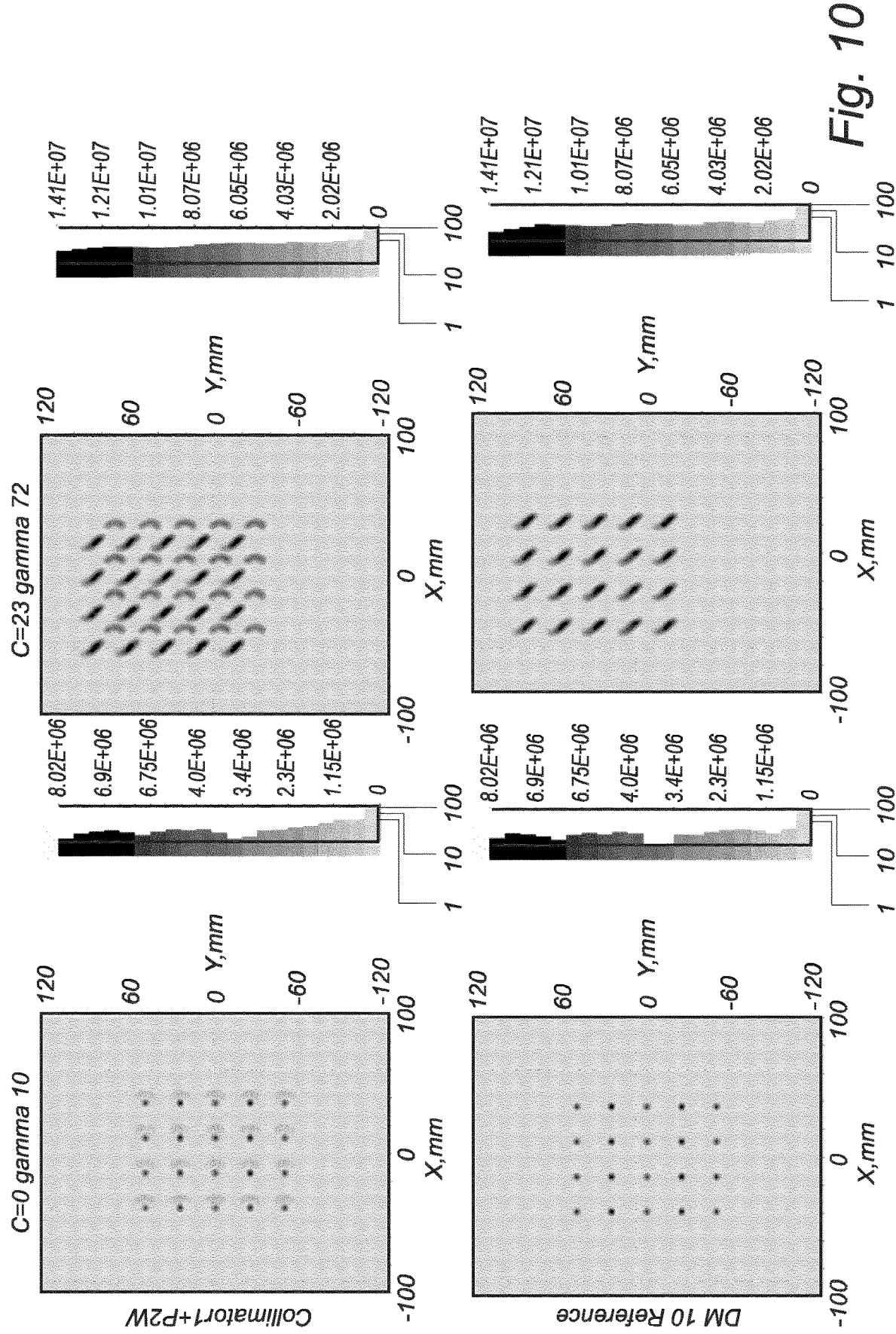
FIG. 10 shows four different plots illustrating the performance of an array of light emitting devices according to the invention. The upper two plots illustrate the appearance of an array of light emitting devices according to the invention seen from two different angles, the right hand one being in the peak intensity direction. The lower two plots illustrate the appearance of a prior art array of light emitting devices seen from the same two different angles, the right hand one again being in the peak intensity direction.

Finally, FIG. 10 shows four different plots illustrating the performance of an array of light emitting devices according to the invention. The upper two plots illustrate the appearance of an array of light emitting devices according to the invention seen from two different angles, the left hand one being the direction denoted C=0 gamma 10 and the right hand one being in the peak intensity direction, C=23 gamma 72. The lower two plots illustrate the appearance of a prior art array of light emitting devices employing a lens plate of the DM10-type seen from the same two different angles, the right hand one again being in the peak intensity direction. It is clear to see that the optical architecture of a light emitting device according to the invention has an improved appearance, since it produces twice as many bright areas as there are LEDs in the array (see upper right image plot in FIG. 10). The effect is most pronounced in the peak direction (C23 gamma 72) where there are additional bright areas in between the original ones. From a distance, this will appear more uniform, which is perceived as more comfortable to the eye.

Figure 11:
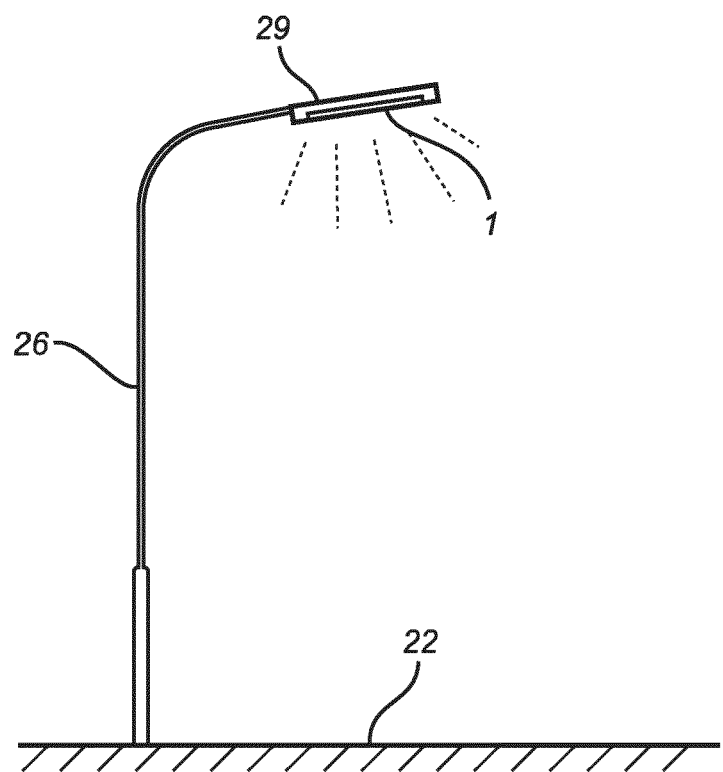
FIGS. 11 and 12 illustrate schematically two different embodiments of a luminaire comprising a light emitting device according to the invention.
Figure 12:
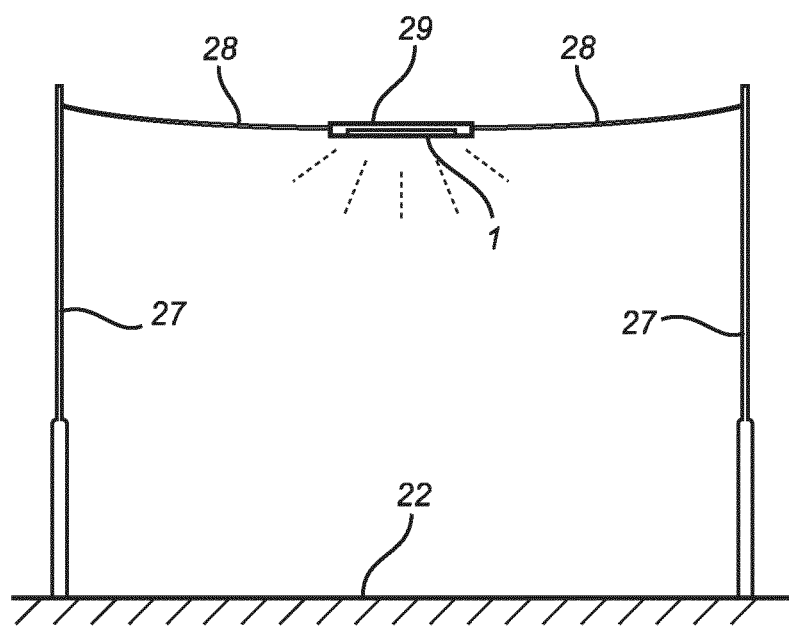

The light emitting device 1 or 100 according to the invention may be employed in a luminaire, such as an outdoor luminaire, e.g. in a street lighting luminaire, or in an industry luminaire for indoor or outdoor use where an enhanced peak intensity is desired. FIGS. 11 and 12 illustrate schematically two different exemplary embodiments of such a luminaire. As is also illustrated in FIGS. 11 and 12, the light emitting device 1 or 100 according to the invention may also comprise or be arranged in a housing 29. The housing 29 may comprise a reflector or reflecting inner surface as well as a transparent cover.

Referring particularly to FIG. 11, such a luminaire may comprise a pole 26. The downward direction in which the collimated and redirected light 9' formed by the first TIR element 4 propagates may then be defined as being parallel to a longitudinal extension of the pole 26.

Alternatively, as shown particularly in FIG. 12, such a luminaire may be a suspended luminaire, e.g. suspended from a line system 28 extending between two buildings, poles 27 or the like. The downward direction in which the collimated and redirected light 9' formed by the first TIR element 4 propagates may then be defined as being parallel to the vertical, where the vertical is intended to refer to the direction aligned with the direction of the force of gravity, up or down, as materialized e.g. with a plumb line.

As another alternative such luminaire may be mounted on another type of fixed structure, such as a wall.

The person skilled in the art realizes that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A light emitting device comprising:
   at least one light source adapted for, in operation, emitting light source light,
   at least one free-shape refractive lens element configured to aim the light source light emitted by the at least one light source in a first direction towards a surface to be illuminated by the light emitting device, the free-shape refractive lens element comprising a first end adapted for facing in a direction towards the surface to be illuminated and a second end adapted for facing in a direction away from the surface to be illuminated, at least one first TIR element, the first TIR element being a collimating TIR element configured to collimate and redirect light source light emitted from the at least one light source in a second direction away from the surface to be illuminated into first TIR element light propagating, parallel and in a downward direction, the first TIR element comprising a light incoupling surface and a light outcoupling surface, the light incoupling surface of the first TIR element being arranged at the second end of the free-shape refractive lens element, and at least one second TIR element configured to redirect first TIR element light collimated and redirected by the first TIR element into second TIR element light propagating In a direction towards the surface to be illuminated and comprising an intensity distribution with two intensity peaks at wide angles that are aligned with the intensity peaks of refractive lens element light aimed by the free-shape refractive lens element, the at least one second TIR element being arranged at the light outcoupling surface of the first TIR element, the light outcoupling surface indicating the position where the first TIR element is ending and the second TIR element is beginning.

2. A light emitting device according to claim 1 and comprising an array of light sources and associated with each light source of the array of light sources a free-shape refractive lens element, a first TIR element and a second TIR element.

3. A light emitting device according to claim 2 and comprising a Jens plate comprising an array of units, each unit comprising a free-shape refractive lens element, a first TIR element and a second TIR element.

4. A light emitting device according to claim 3, wherein the lens plate is provided in one piece.

5. A luminaire comprising a light emitting device according to claim 1.

6. A luminaire according to claim 5, and further comprising a pole, wherein the parallel, downward direction is parallel to a longitudinal extension of the pole, within an angle of 5 degrees with the longitudinal extension of the pole, or within an angle of 30 degrees with the longitudinal extension of the pole.

7. A luminaire according to claim 5, and further comprising a suspension arrangement, wherein the parallel, downward direction is parallel to the vertical within an angle of 5 degrees with the vertical, or within an angle of 30 degrees with the vertical.

8. A luminaire according to claim 5, the luminaire being an industry luminaire, a tunnel luminaire, a road lighting luminaire, a wall washing luminaire or a street lighting luminaire.

9. A light emitting device according to claim 1, wherein the at least one second TIR element is an asymmetric element or a tilted prism-shaped element or an element being mirror symmetric in a vertical plane perpendicular to the surface to be illuminated, and asymmetric in an orthogonal direction across the surface to be illuminated.

10. A light emitting device according to claim 1, wherein the at least one second TIR element comprises a plurality of light outcoupling elements, the light outcoupling elements comprising a shape being prism-shaped, cone-shaped or a combination of prism-shaped and cone-shaped.

11. A light emitting device according to claim 1, wherein the at least one second TIR element comprises a plurality of light outcoupling elements, the light outcoupling elements comprising a cross-sectional shape being any one of triangular, asymmetric triangular and isosceles triangular, or the light outcoupling elements comprising a curvature or a spline shape.

12. A light emitting device according to claim 1, wherein the at least one second TIR element is provided with a surface texture, a surface coating or an anti-reflection coating.

13. A light emitting device according to claim 1, wherein the at least one free-shape refractive lens element, the at least one first TIR element and the at least one second TIR element are provided in one piece.

14. A light emitting device according to claim 1, wherein the at least one free-shape refractive lens element, the at least one first TIR element and the at least one second TIR element are injection molded or cast or molded or 3D printed or compression molded or embossed.

* * * * *